March 4, 1969  H. FLEISSNER  3,430,352
METHOD AND APPARATUS FOR THE HEAT-TREATMENT OF MATERIALS
WHICH CAN BE STRESSED IN A LONGITUDINAL DIRECTION
Filed March 1, 1967

Inventor:
HANS FLEISSNER

BY Dickey & Craig
ATTORNEYS

United States Patent Office 3,430,352
Patented Mar. 4, 1969

3,430,352
METHOD AND APPARATUS FOR THE HEAT-TREATMENT OF MATERIALS WHICH CAN BE STRESSED IN A LONGITUDINAL DIRECTION
Hans Fleissner, Egelsbach, near Frankfurt am Main, Germany, assignor to Vepa AG, Basel, Switzerland
Filed Mar. 1, 1967, Ser. No. 619,752
Claims priority, application Germany, Mar. 2, 1966, A 51,720
U.S. Cl. 34—15     18 Claims
Int. Cl. F26b 21/12, 13/06, 3/06

ABSTRACT OF THE DISCLOSURE

The present disclosure relates to a process and apparatus for the heat-treatment of materials which advantageously can be stressed in the longitudinal direction, wherein the amount of the treatment medium, for example, air, drawn into the sieve drum and/or sieve drums by fan means communicating with the interior of said sieve drum can be controlled by baffle means disposed within said sieve drum. The baffle means are at least partially permeable to the treatment medium, that is, perforations are provided in the baffle means. According to the present disclosure, the free area of the baffle means can be controlled from zero to substantially complete access for the treatment medium.

Background of the invention

The present invention relates to a method and apparatus for the heat-treatment, for example, for drying, of materials which advantageously can be stressed in the longitudinal direction in one continuous length. However, the present invention is also applicable to loose, fibrous materials, for example, rayon staple which is only slightly permeable to air. More particularly, the present invention concerns an apparatus wherein the material being treated is guided on one or more sieve drums in a chamber, for example, a drying chamber, said sieve drum being provided at one or both faces with fan means. The sieve drum also contains internally disposed baffle means at that portion of the sieve drum not covered with the material being treated, said baffle means permitting substantially complete access of the treatment medium to the inside of the sieve drum, or restricting said access, up to substantially complete restriction, of the treatment medium from entering the inside of said sieve drum. Besides drying, the present invention is also applicable to cooling, heat-setting, thermosolizing, steaming and curing, polymerizing synthetic resin impregnations, and similar heat-treatment processes. Suitable materials which can be treated using the apparatus of the present invention include tow, silver, fabric, tricot materials, paper, cardboard and the like.

In considering the effectiveness of sieve drum processes and apparatus for the heat-treatment of various kinds and types of materials, it is proposed to enlarge the air quantities circulated in the sieve drum dryer by keeping that portion of the sieve drum which is not covered with the material being treated, completely or at least partially free from baffle means which hinder air penetration into the sieve drum. By employing this measure, the heat transfer and/or the heat absorption by the treatment medium, for example, air, at the heaters is substantially improved since the air passes the heaters at essentially higher speeds. Furthermore, due to the better mixing of the treatment medium in the heating device, a more uniform heating-up of the treatment medium is effected whereby the temperature distribution throughout the sieve drum is more uniform thus providing more uniform and effective heat treatment. When for example, air passes into the sieve drum at that portion of said sieve drum not covered with the material being treated, the sieve drum jacket is well circulated with the hot air causing said jacket to become heated up. This heat is then transferred to the material being treated by heat conduction through the contact of said material with the surface of the sieve drum. When treating materials which are not permeable to air or only slightly permeable, the efficiency and production of the sieve drum dryer can be substantially improved by employing the above principle.

Accordingly, it is an object of the present invention to avoid the prior art disadvantages in the heat-treatment of materials, for example, textile materials.

Another object of the present invention is to improve the heat-treatment of materials which are not permeable or are only slightly permeable to the treatment medium.

A further object of the present invention is to provide an improved process and apparatus for the heat-treatment of materials wherein a better heat transfer and/or heat adsorption by the treatment medium at the heating means is effected and a better mixing and uniform heating-up of the treatment medium is achieved.

A still further object of the present invention is to provide an improved heat-treatment process and apparatus wherein heat is transferred to the material being treated by heat conduction wherein said material to be processed is contacted with the surface of the heated sieve drum.

Another, further object of the present invention is to provide an improved heat-treatment process and apparatus wherein baffle means are provided on the inside of the sieve drum said baffle means functioning to control the amount of the treatment medium which is drawn into the sieve drum at that portion of said drum which is not covered with the material being treated.

Other objects and further scope of applicability of the present invention will become apparent from the detailed description given hereinafter; it should be understood, however, that the detailed description and specific examples, while indicating preferred embodiments of the present invention, are given by way of illustration only, since various changes and modifications within the spirit and scope of the invention will become apparent to those skilled in the art from this detailed description.

Summary of the invention

Pursuant to the present invention, it has been found that a much improved process and apparatus for the heat-treatment of materials can be achieved by making a portion of the baffle means air or gas permeable, for example, by providing perforated baffle means. In a further embodiment of the present invention, the free area of said baffle means can be changed wherein said baffle means permits substantially complete access of the treatment medium into the sieve drum or restricts the access of the treatment medium to the point where substantially none of the treatment medium is permitted to pass into the sieve drum. Thus, for example, if a baffle means is perforated and if at the perforated part of said baffle, an adjustable sheet is arranged with the same perforations as that of the baffle, by adjusting this sheet, the free area permitting access of the treatment medium to the inside of the sieve drum can be steplessly adjusted from a maximum free area to a free area of zero.

When more than one sieve drum is used in a heat-treatment installation, which is frequently the case, to achieve an automatic and proper passage of the material being treated from one sieve drum to the next sieve drum it is proposed to provide baffle means in each sieve drum with a permeable portion and an impermeable portion, said impermeable portion being located in the region where the material being treated is passed from one sieve drum to the next sieve drum, said impermeable portion of the baffle means being separated from the permeable portion of the baffle means by sealing strips. Thus, it is assured that in that portion of the baffle which is impermeable to air, no suction draft exists at the sieve drum.

For materials which are readily blown off of the sieve drum, for example, loose wool, cotton, or rayon staple, and the like, and especially in an installation using two rows of staggered sieve drums, stationary sieve sheets are provided which extend over the whole width of the treatment chamber and which surround, at a predetermined distance, that portion of the sieve drum covered with the material being treated. It has been found to be advantageous to perforate the sieve sheets only over the working width of the apparatus and/or over the same width as the sieve drums. In order to avoid cross currents in the space between the sieve drum and the sieve sheet, it is proposed by the present invention to extend the impermeable portion of the baffle means to at least the sieve sheet of the adjacent drum. The last-mentioned embodiment of the present invention with concentrically curved sieve sheets surrounding the drums is not limited only to an assembly with staggered sieve drums but can also be used in an assembly with sieve drums which are arranged in one row and provided with sieve sheets.

*Brief description of the drawings*

The present invention will become fully understood from the detailed description hereinbelow and the accompanying drawings which are given by way of illustration only and thus are not limitive of the present invention and wherein.

*Description of the preferred embodiments*

Figure 1:
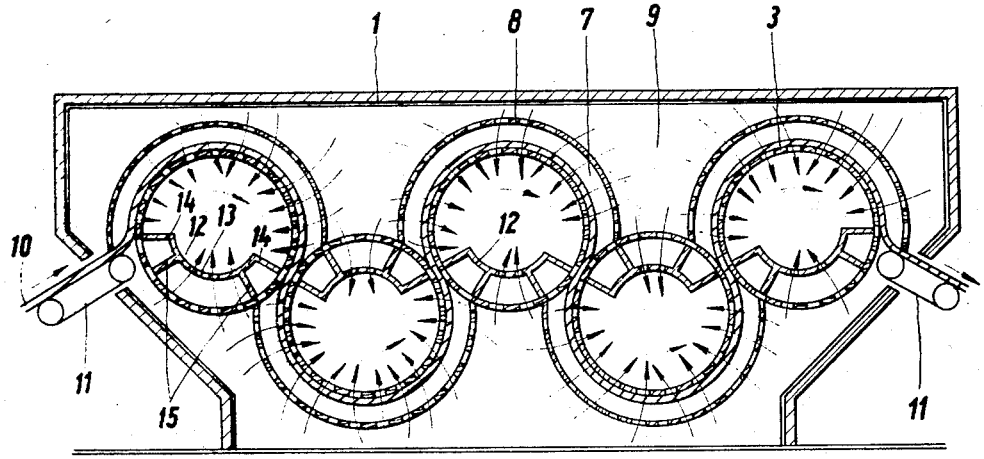
FIGURE 1 is a longitudinal section of the treatment chamber of a sieve drum installation according to the present invention.

Referring now to the drawings wherein like reference numerals are used throughout the various views to designate like parts, the apparatus of the present invention comprises a housing 1 which is subdivided into a treatment chamber 2 with sieve drums 3 subjected to a suction draft, and a fan chamber 4 with fan wheels 5 (vacuum means) correlated to the faces of the sieve drums and containing heating means 6. The treatment chamber 2 is separated from the fan chamber within the range of the sieve drums 3 by a partition 7.

In the embodiment of the present invention according to FIGURE 1, the partition 7 extends to concentrically curved sieve sheets 8. Thus a large free area 9 is obtained for the passage of the air, said area also resulting in a stabilization and uniform distribution of the air.

Figure 2:
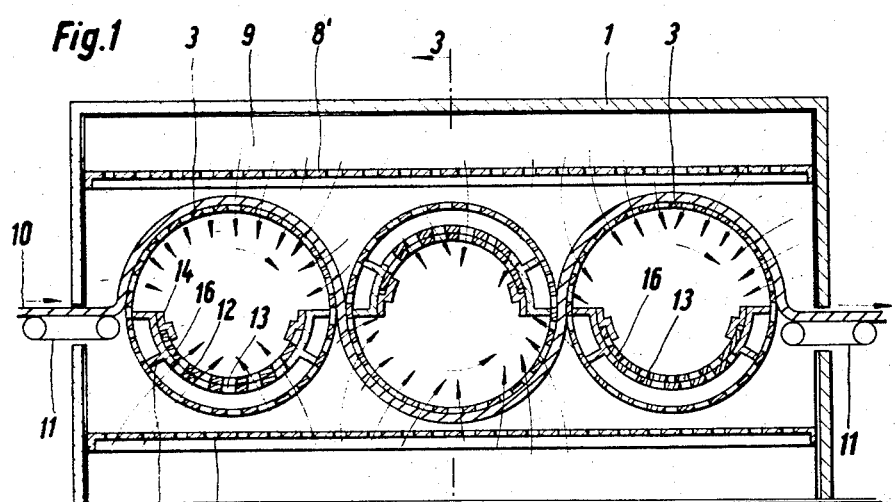
FIGURE 2 is a longitudinal section of the treatment chamber of a sieve drum installation according to another embodiment of the present invention.
Figure 3:
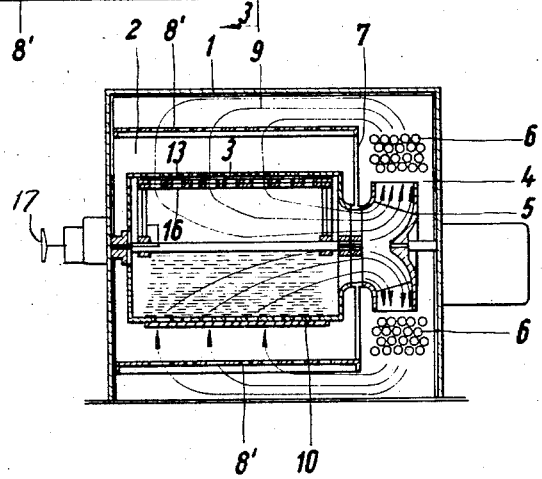
FIGURE 3 is a cross-sectional view of the installation according to FIGURE 2, along line 3—3.

In the embodiment of the present invention according to FIGURES 2 and 3, plane sieve sheets 8' are provided above and beneath the sieve drums 3, said sieve sheets also serving as a stabilization and equalization of the air. The partition 7 also extends to the sieve sheets 8'.

In all of these installations conveyor belts 11 are provided for feeding and discharging material 10 to be processed. At the portions of the sieve drums which are not covered with the material being treated, baffle means 12 are arranged in the sieve drums. These baffle means define a plenum chamber with the internal surface of the sieve drum. However, these baffle means are not completely impermeable to air but rather the central portion of the baffle means is perforated so that within this area the sieve drums draw in part of the circulated air thus heating up the sieve drums. To assure proper passage of the material being treated from one sieve drum to the next sieve drum, end portions 14 are sealed from the suction draft of the center portion of the baffle means by means of an additional sealing strip 15, so that in these areas only the suction draft of the adjacent sieve drum is effective.

In the embodiment of the present invention according to FIGURE 2, the center, perforated portion 13 of the baffle means 12 is further equipped with a perforated sheet 16 which is provided with the same perforations as the baffle means 12. By adjusting this perforated sheet, the free area of the center portion of the baffle can be adjusted from a position permitting substantially complete access of the treatment medium into the interior of the sieve drum to any intermediate position of partial access and finally to a position where the free area is zero, as shown in the last sieve drum in FIGURE 2. However, it has been found to be advantageous and desirable if the free area of the baffle means 12 is reduced with progressive drying, since with progressive drying the material to be processed generally becomes better permeable to air, and thus larger quantities of the drying air can be drawn through the material being treated. The perforated sheets 16 which control the amount of free area of the baffle means, can be adjusted manually, by handwheel means 17 or if desired, automatically by means located on the outside of the sieve drum (not shown).

The sieve drum installation of the present invention can be provided with any number of sieve drums, for example, a series of three or five sieve drums can be effectively used. In practice, installations with up to 30 drums are frequently used. However, with very high speeds of production, substantially larger numbers of drums can be used in one installation. The number of drums is in no way limited. In installations using a plurality of sieve drums, the free area of the baffle means may be varied or graduated on subsequent groups of sieve drums.

Since modifications of this invention will be apparent to those skilled in the art, it is not desired to limit the invention to the exact constitution shown and described. Accordingly, all suitable modifications and equivalents may be resorted to which fall within the scope of the appended claims.

It is claimed:

1. An apparatus for the heat-treatment of material which comprises a treatment chamber, at least one cylindrical sieve drum with a perforated surface rotatably disposed within said chamber, a portion of the cylindrical surface of said sieve drum serving as a conveying means and providing a continuous treatment surface in said chamber, means for introducing the material to be treated to said conveying means, vacuum means communicating with the interior of the cylindrical sieve drum, baffle means disposed on the inside of said sieve drum at that portion of the sieve drum not covered with the material being treated, said baffle means being at least partially perforated to permit access of the treatment medium to the interior of the sieve drum, and outlet means for removing the treated material from the treatment chamber.

2. The apparatus of claim 1, wherein the baffle means is concentrically curved to that portion of the sieve drum not covered by the material being treated and defines a plenum chamber with the internal surface of said sieve drum, said plenum chamber having a permeable central portion and impermeable end portions.

3. The apparatus of claim 2, wherein the permeable central portion of the plenum chamber is separated from the impermeable end portions by sealing strip means.

4. The apparatus of claim 2, wherein the central portion of the baffle means is provided with an adjustable perforated sheet means with the same perforations as said baffle means, said perforated sheet means having a surface complementary to at least a substantial portion of the surface of said baffle means and capable of adjusting the free area of said baffle means.

5. The apparatus of claim 4, wherein the free area in the baffle means is adjusted manually.

6. The apparatus of claim 1, wherein perforated stationary sieve sheets extend over substantially the entire width of the treatment chamber, said sieve sheets being perforated only over the working width of the apparatus.

7. The apparatus of claim 6, wherein the stationary sieve sheets are perforated over the same width as the sieve drums.

8. The apparatus of claim 3, wherein more than one sieve drum is disposed within said chamber, and concentrically curved stationary sieve sheets are disposed around the drum portions carrying the material being treated, and wherein the impermeable end portions of the plenum chamber extend at least to the sieve sheet of the adjacent sieve drum.

9. The apparatus of claim 8, wherein the sealing strip means coincides with the sieve sheet of the adjacent sieve drum.

10. The apparatus of claim 1, wherein more than one sieve drum is disposed in the treatment chamber, the free area of the baffle means being largest at the inlet sieve drum and gradually reduced on subsequent sieve drums.

11. A method for the heat-treatment of material which can be stressed in the longitudinal direction and which is only slightly air-permeable which comprises conveying the material to be treated on a portion of the surface of at least one sieve drum subjected to a suction draft, through a treatment zone, passing a heated gaseous treatment medium around and through the material being treated, and controlling the amount of treatment medium which is drawn into the sieve drum at the portion of said sieve drum not covered with the material being treated.

12. The method of claim 11, wherein the material being treated is selected from the group consisting of tow, silver, fabric, tricot materials, paper, cardboard, and the like.

13. The method of claim 11, wherein the free area of that portion of the sieve drum not covered with the material being treated can be adjusted from a maximum free area to a free area of zero, thus controlling the access of the treatment medium to the interior of said sieve drum.

14. The method of claim 13, wherein the amount of the treatment medium permitted to enter the sieve drum is controlled manually.

15. The method of claim 13, wherein more than one sieve drum is provided and wherein the treatment medium is prevented from entering the sieve drum in the region where the material being treated is passed from one sieve drum to the next sieve drum.

16. The method of claim 11, wherein the amount of the treatment medium permitted to enter the sieve drum is reduced with progressive drying.

17. The method of claim 11, wherein more than one sieve drum is provided and wherein the amount of the treatment medium permitted to enter the sieve drum is largest at the inlet sieve drum of the treatment process and is progressively reduced to the outlet sieve drum.

18. The method of claim 11, wherein heat is transferred to the material being treated by heat conduction with the heated surface of the sieve drum.

References Cited

UNITED STATES PATENTS

| | | | |
|---|---|---|---|
| 2,174,744 | 10/1939 | Hill | 34—122 X |
| 2,919,496 | 1/1960 | Fleissner | 34—115 |
| 3,140,157 | 7/1964 | Fleissner | 34—115 |
| 3,196,555 | 7/1965 | Friedel | 34—115 |
| 3,197,896 | 8/1965 | Fleissner | 34—115 |
| 3,303,576 | 2/1967 | Sisson | 34—115 |
| 3,345,757 | 10/1967 | Saane | 34—115 |

WILLIAM J. WYE, *Primary Examiner.*

U.S. Cl. X.R.

34—16, 115, 122; 162—370